United States Patent
Lohr et al.

(10) Patent No.: US 7,324,156 B2
(45) Date of Patent: Jan. 29, 2008

(54) ATTACHABLE CARRIER HAVING AN OPTICAL ACCESSORY FOR A PORTABLE ELECTRONIC DEVICE

(75) Inventors: Phillips W. Lohr, Deerfield, IL (US); Michael Harshbarger, Lake Villa, IL (US)

(73) Assignee: Motorola Inc., Schaumburg, IL (US)

( * ) Notice: Subject to any disclaimer, the term of this patent is extended or adjusted under 35 U.S.C. 154(b) by 719 days.

(21) Appl. No.: 10/429,012

(22) Filed: May 2, 2003

(65) Prior Publication Data

US 2004/0218081 A1 Nov. 4, 2004

(51) Int. Cl.
*H04N 5/225* (2006.01)

(52) U.S. Cl. .................... 348/375; 348/360

(58) Field of Classification Search ........ 348/373–376, 348/360, 335; 396/71, 529, 530
See application file for complete search history.

(56) References Cited

U.S. PATENT DOCUMENTS

| 4,814,806 | A | * | 3/1989 | Flax ........................ 396/544 |
| 4,933,692 | A | * | 6/1990 | Kudo et al. ................. 396/61 |
| 4,967,214 | A | * | 10/1990 | Taniguchi et al. ............ 396/71 |
| 5,095,367 | A | * | 3/1992 | Shimizu ..................... 348/375 |
| 5,146,256 | A | * | 9/1992 | Frosig et al. ............... 396/544 |
| 5,444,507 | A | * | 8/1995 | Palmer ....................... 396/421 |
| 5,666,159 | A | * | 9/1997 | Parulski et al. ............ 348/211.2 |
| 6,157,781 | A | * | 12/2000 | Konno et al. ................. 396/71 |
| 6,181,381 | B1 |  | 1/2001 | Evans |
| 6,489,991 | B2 | * | 12/2002 | Ishida ....................... 348/335 |
| 6,937,819 | B2 | * | 8/2005 | Brough ...................... 396/429 |
| 2001/0004269 | A1 | * | 6/2001 | Shibata et al. ........... 348/333.06 |
| 2002/0017545 | A1 |  | 2/2002 | Badillo et al. |
| 2002/0075398 | A1 | * | 6/2002 | Milam et al. ............... 348/374 |
| 2002/0108118 | A1 | * | 8/2002 | Cohen et al. ............... 725/105 |
| 2004/0207750 | A1 | * | 10/2004 | Wu et al. ................... 348/375 |
| 2005/0104995 | A1 | * | 5/2005 | Spryshak et al. ........... 348/360 |

FOREIGN PATENT DOCUMENTS

WO  WO 02/09396 A2  1/2002

* cited by examiner

*Primary Examiner*—Lin Ye
*Assistant Examiner*—Timothy J Henn
(74) *Attorney, Agent, or Firm*—Joseph T. Cygan

(57) ABSTRACT

A portability enhancement device (100) for enhancing portability and optical capability of a portable electronic device (102) equipped with a camera (108) and camera lens (110) is provided. The portability enhancement device (100) includes an attachment assembly (112) having a coupling interface (120) attachable to the portable electronic device (102), an optical accessory (122) disposed about the coupling interface (120), and a carrier (124) attached to the attachment assembly (112). When the portability enhancement device (100) is attached to the portable electronic device (102), the portability and the optical function of the portable electronic device (102) is enhanced.

11 Claims, 3 Drawing Sheets

ATTACHABLE CARRIER HAVING AN OPTICAL ACCESSORY FOR A PORTABLE ELECTRONIC DEVICE

FIELD OF THE INVENTION

The present invention generally relates to an apparatus for providing an attachable accessory to a portable device, more specifically to an apparatus for providing an integrated attachable device configured to enhance portability and optical features of the portable device.

BACKGROUND OF THE INVENTION

With the advent of cameras being embedded in various portable electronic devices, there is a continued desire to provide multi-purpose accessories to enhance the functionality, portability, and product life extension of those portable electronic devices. In today's cellular telephone market, there are many so-called "candy-bar" style cellular telephones having a single-unit body style without folding or clam-shell mechanism. The candy-bar style cellular telephones are cost-effective in design and manufacturing, and can also provide stylish appearances. The candy-bar style cellular telephone can include camera features integrated into the cellular telephone. However, most of these candy-bar style cellular telephones do not, by their inherent mechanical design, include a camera lens cover. Additionally, to keep the cost-effectiveness of the design, camera features integrated into these cellular telephones are inexpensive, and do not generally provide optical functional enhancement such as zoom or other enhancements normally associated with a camera.

Separately providing each optical enhancement accessory such as a lens cover and zoom lens for a portable electronic device such as a cellular telephone is cumbersome and detrimental to its portability.

DETAILED DESCRIPTION OF THE PREFERRED EMBODIMENTS

The present invention generally provides an apparatus for an integrated attachable device configured to enhance portability and optical features of the portable device.

Figure 1:
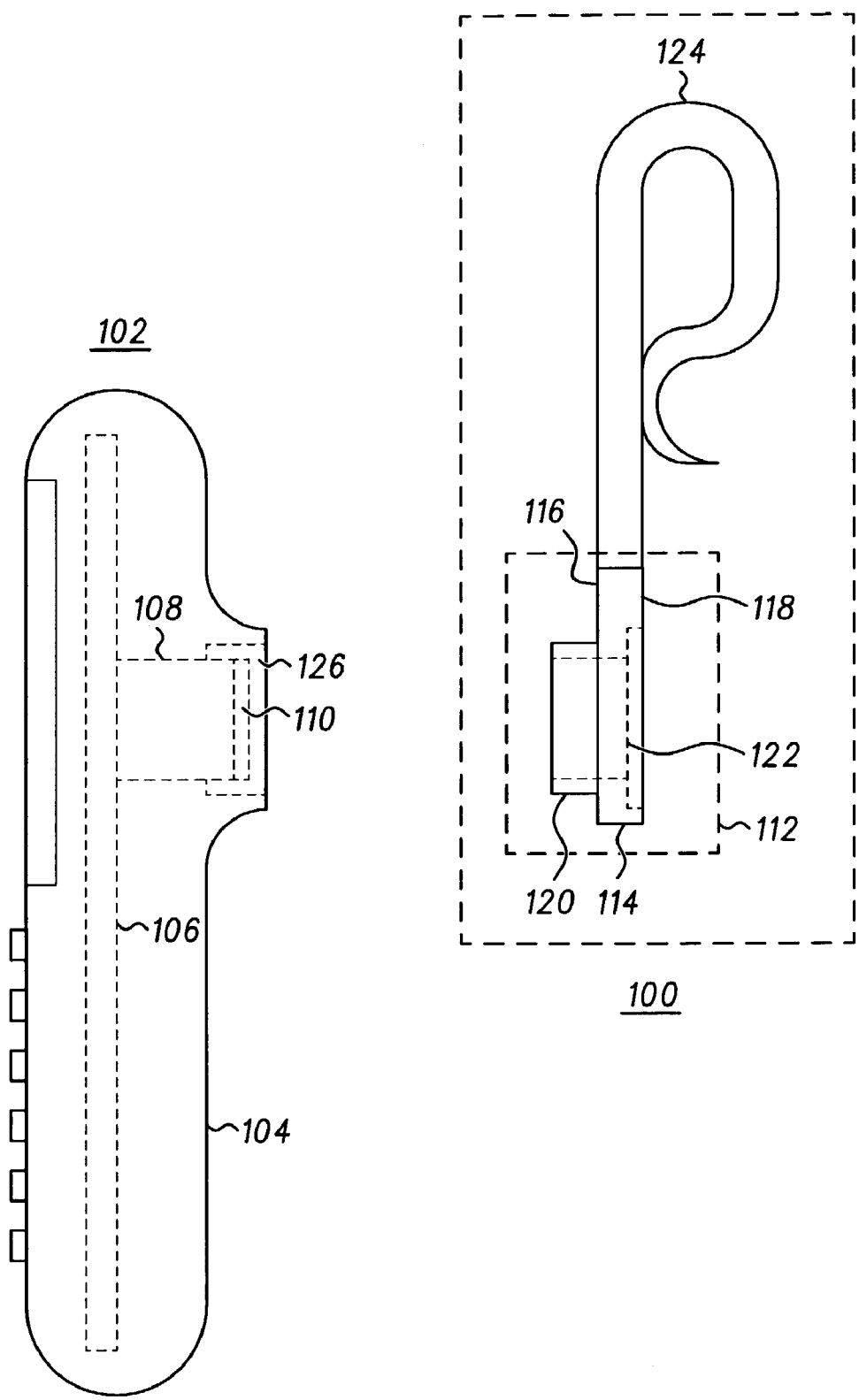
FIG. 1 is an exemplary diagram of a first embodiment of the present invention shown with a portable electronic device.

FIG. 1 is an exemplary diagram of a first embodiment of the present invention. An attachable portability enhancement device 100 is shown with a portable electronic device 102, to which it is attachable. The portable electronic device 102 comprises a housing 104, which houses normally associated circuits disposed on printed circuit board 106 such as, but not limited to, a processor, transceiver, display, memory, and power supply, and is also equipped with a built-in camera 108 and a camera lens 110. The attachable portability enhancement device 100 comprises an attachment assembly 112, which comprises an attachment body 114, which has a first surface 116 and a second surface 118, a coupling interface 120 disposed on the first surface 116, an optical accessory 122 disposed about the coupling interface 120, and a carrier 124 attached to the attachment assembly 112, which is shown as a single-piece clip. In this embodiment, the attachable portability enhancement device 100 is shown to attach to the portable electronic device 102 by coupling the coupling interface 120 in a receiving groove 126 of the housing 104 around the camera lens 110. When the attachable portability enhancement device 100 is attached to the portable electronic device 102, the optical accessory 122 lines up with the camera lens 110, and provides an added function to the camera lens 110. The optical accessory 122 may be a variety of optical devices designed to enhance camera lens utility. Examples of such optical devices are, but not limited to, a lens cover for protecting the camera lens 110, a zoom lens, and an optical filter. The optical accessory 122 may be permanently affixed in the attachable portability enhancement device 100, or it may also be an interchangeable among several optical devices. It is to be understood that a variation of the coupling interface 120 is readily apparent to one skilled in the art, and is not limited to the style shown. For example, instead of the coupling interface 120 disposed about the perimeter of the optical accessory 122, the coupling interface may be one or more pegs securable to the housing 104.

Figure 2:
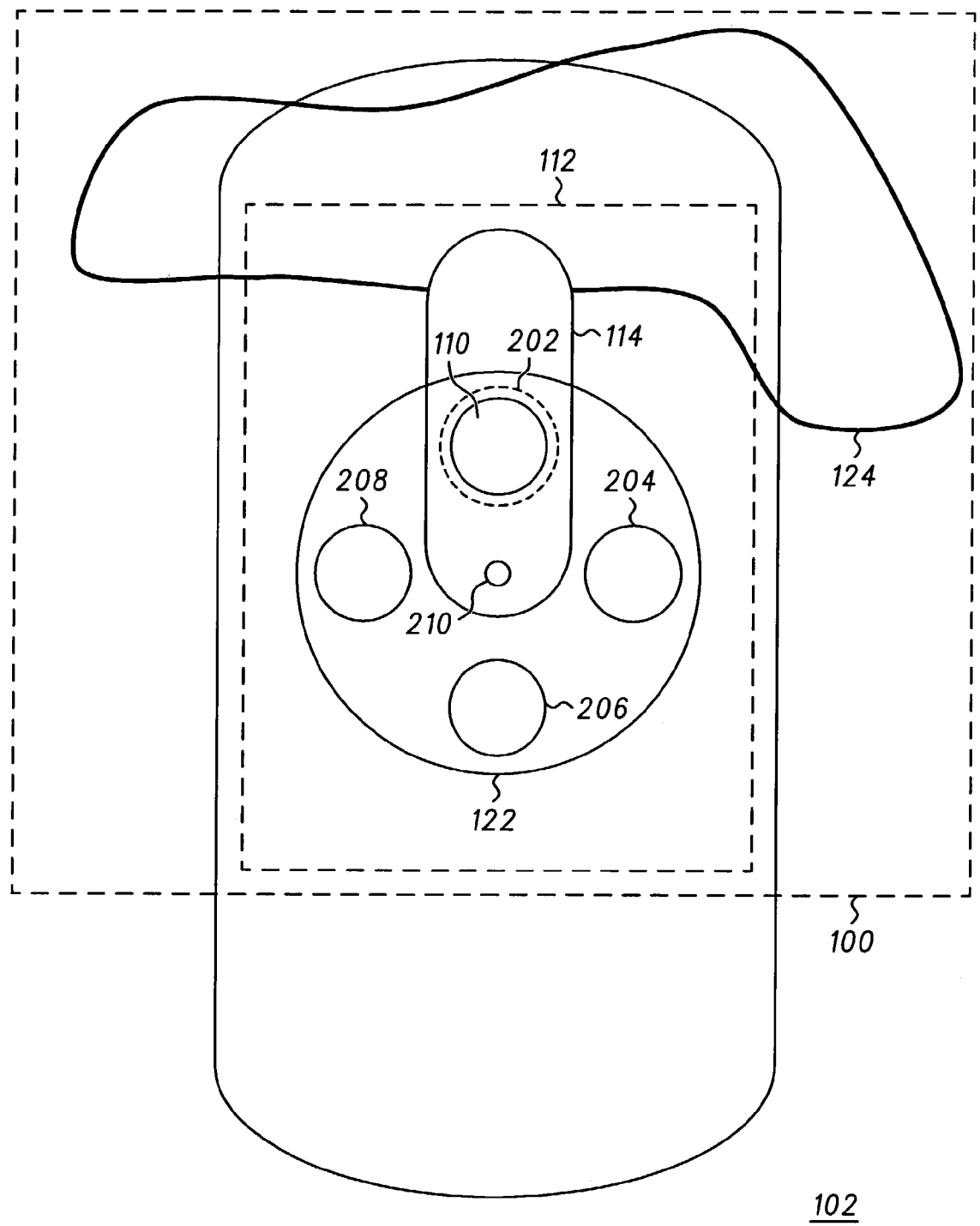
FIG. 2 is an exemplary diagram of a second embodiment of the present invention.

FIG. 2 is an exemplary diagram of a second embodiment of the present invention shown with the attachable portability enhancement device 100 attached to the portable electronic device 102. In this embodiment, the carrier 124 of the attachable portability enhancement device 100 attached to the attachment assembly 112 is shown as a lanyard physically attached to the attachment body 114. The optical accessory 122 in this embodiment is shown as a selectable optical device having first, second, third, and fourth optical devices 202, 204, 206, and 208, respectively. It is to be understood that the optical accessory 122 with four optical devices 202, 204, 206, and 208, is shown as an example, and different numbers of optical devices in the optical accessory may be used. In this example, a user may select a desired optical device 202, 204, 206, or 208 by rotating the optical accessory 122 about its axis 210, and placing the desired optical device over the camera lens 111. Each of the four optical devices 202, 204, 206, and 208, may have different optical function from each other. For example, the first optical device 202 may be a lens cover to protect the camera lens 110 when it is not in use, the second optical device 204 may be a five-times magnifying lens, third optical device 206 may a wide-angle lens, and the fourth optical device 208 may a polarized filter. Another example of selectable optical devices may be disposed on a slidable optical accessory where a user is able to place a desired optical device by sliding the optical accessory over the camera lens 110.

Figure 3:
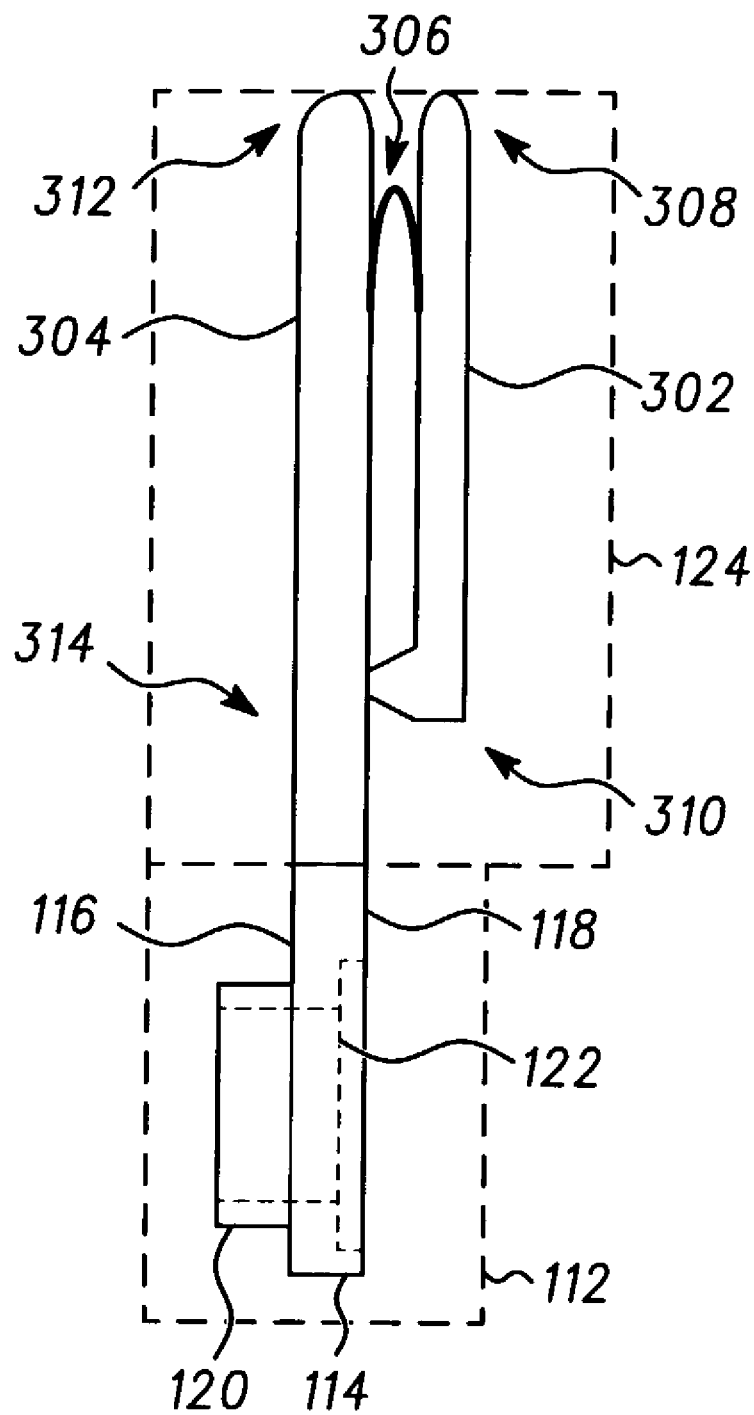
FIG. 3 is an exemplary diagram of a third embodiment of the present invention.

FIG. 3 is an exemplary diagram of a third embodiment of the present invention shown with the attachable portability enhancement device 100. In this embodiment, the carrier 124 of the attachable portability enhancement device 100 attached to the attachment assembly 112 is shown as a spring-loaded clip comprising three pieces: an extension arm 302, a base arm 304, and a clamping spring 306. The attachment assembly 112 comprises an attachment body 114 having a first surface 116 and a second surface 118, a coupling interface 120 disposed on the first surface 116, an optical accessory 122 disposed about the coupling interface 120. The extension arm 302 has a first arm end 308 and a second arm end 310 located at opposite ends of the extension arm 302. The base arm 304 has a first base end 312 and a second base end 314 located at opposite ends of the base arm 304. The first base end 312 is moveably coupled to the first arm end 308 by the clamping spring 306, which provides clamping force at the second arm end 310 against the base arm 304. In this embodiment, the attachment assembly 112 is disposed at the second base end 314.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An attachable portability enhancement device for a portable electronic device equipped with a camera and a camera lens, the attachable portability enhancement device comprising:
    an attachment body having a first surface and a second surface;
    a coupling interface disposed on the first surface of the attachment body, the coupling interface configured to attach to the portable electronic device;
    an optical accessory coupled to the coupling interface, the optical accessory being optically coupled to the camera lens when the attachable portability enhancement device is attached to the portable electronic device by the coupling interface; and
    a carrier attached to the attachment body, wherein the carrier comprises an extension arm having a first arm end and a second arm end, the first arm end located at an opposite end of the extension arm from the second arm end; and
    wherein the carrier further comprises a base arm having a first base end and a second base end, the first base end located at an opposite end of the base arm from the second base end, the first base end moveably coupled to the first arm end, wherein the attachment body is coupled to the second base end.

2. The attachable portability enhancement device of claim 1, wherein the carrier further comprises a clamping spring coupled to the extension arm at the first arm end and to the base arm at the first base end.

3. The attachable portability enhancement device of claim 1, further comprising a lens protection cover, the lens protection cover detachably coupled to the attachment body.

4. The attachable portability enhancement device of claim 1, wherein the optical accessory is a zoom lens.

5. the attachable portability enhancement device of claim 1, wherein the optical accessory is an optical filter.

6. The attachable portability enhancement device of claim 1, wherein the optical accessory is one of an adjustable optical device, an interchangeable optical device, and a selectable optical device.

7. The attachable portability enhancement device of claim 6, wherein the selectable optical device comprises a plurality of optical devices.

8. The attachable portability enhancement device of claim 1, wherein the carrier attached to the attachment body is a lanyard.

9. A portable communication device having a camera and a camera lens, the portable communication device comprising:
    a housing, the housing including a transceiver circuitry within the portable communication device, the housing having a first coupling interface;
    an attachment body having first and second surfaces, the attachment body having a second coupling interface attachable to the portable communication device by the first coupling interface, the attachment body having an optical accessory coupled to the second coupling interface, wherein the optical accessory is configured to optically couple to the camera lens when the attachment body is attached to the portable communication device; and
    a carrier attached to the attachment device, wherein the carrier comprises an extension arm having a first arm end and a second arm end, the first arm end located at an opposite end of the extension arm from the second arm end; and
    wherein the carrier further comprises a base arm having a first base end and a second base end, the first base end located at an opposite end of the base arm from the second base end, the first base end moveably coupled to the first arm end,
    wherein the attachment body is coupled to the second base end.

10. The portable communication device of claim 9, wherein the carrier further comprises a clamping spring coupled to the extension arm at the first arm end and to the base arm at the first base end.

11. An attachable portability enhancement device for a portable electronic device equipped with a camera and a camera lens, the attachable portability enhancement device comprising:
    an attachment body having a first surface and a second surface;
    a coupling interface disposed on the first surface of the attachment body, the coupling interface configured to attach to the portable electronic device;
    an optical accessory coupled to the coupling interface, the optical accessory configured to optically couple to the camera lens when the attachable portability enhancement device is attached to the portable electronic device by the coupling interface, wherein the optical accessory is one of an adjustable optical device, an interchangeable optical device, and a selectable optical device comprising a plurality of optical devices; and
    a carrier coupled to the attachment body, the carrier comprising an extension arm having a first arm end and a second arm end, the first arm end located at an opposite end of the extension arm from the second arm end, a base arm having a first base end and a second base end, the first base end located at an opposite end of the base arm from the second base end, the first base end moveably coupled to the first arm end by a clamping spring, wherein the second base end is coupled to the attachment body.

* * * * *